(12) United States Patent
Cho et al.

(10) Patent No.: US 8,547,451 B2
(45) Date of Patent: Oct. 1, 2013

(54) APPARATUS AND METHOD FOR OBTAINING HIGH DYNAMIC RANGE IMAGE

(75) Inventors: Seung-ki Cho, Suwon-si (KR); Hyun-seok Hong, Suwon-si (KR); Hee-chul Han, Hwaseong-si (KR); Yang-lim Choi, Seongnam-si (KR); Yong-ju Lee, Seoul (KR)

(73) Assignee: Samsung Electronic Co., Ltd., Suwon-si (KR)

( * ) Notice: Subject to any disclaimer, the term of this patent is extended or adjusted under 35 U.S.C. 154(b) by 115 days.

(21) Appl. No.: 12/980,916

(22) Filed: Dec. 29, 2010

(65) Prior Publication Data

US 2011/0169980 A1 Jul. 14, 2011

(30) Foreign Application Priority Data

Jan. 11, 2010 (KR) ........................ 10-2010-0002385

(51) Int. Cl.
*H04N 5/235* (2006.01)
*H04N 5/228* (2006.01)
*H04N 5/262* (2006.01)
*H04N 5/238* (2006.01)

(52) U.S. Cl.
USPC ................. 348/229.1; 348/222.1; 348/239; 348/364

(58) Field of Classification Search
USPC ........................... 348/222.1, 229.1, 362–368
See application file for complete search history.

(56) References Cited

U.S. PATENT DOCUMENTS

| 7,224,832 B2 * | 5/2007 | Yamada ........................ 382/166 |
| 2007/0139547 A1 * | 6/2007 | Horiuchi ....................... 348/362 |
| 2007/0285526 A1 * | 12/2007 | Mann et al. ................. 348/222.1 |
| 2009/0002525 A1 | 1/2009 | Um et al. |

FOREIGN PATENT DOCUMENTS

KR 102009000503 A 1/2009

* cited by examiner

*Primary Examiner* — Tuan Ho
*Assistant Examiner* — Mekonnen Dagnew
(74) *Attorney, Agent, or Firm* — Sughrue Mion, PLLC

(57) ABSTRACT

Provided is an apparatus and method for obtaining a high dynamic range (HDR) image. The apparatus includes an image sensor generating a first image by applying different exposure times for units of different predetermined regions, an image separating unit separating the first image into images, each of which is composed of regions having an identical exposure time, an image restoring unit restoring the separated images in such a way that each of the separated images has a resolution that is the same as a resolution of the first image, and an image synthesizing unit synthesizing the restored images into a second image.

19 Claims, 5 Drawing Sheets

FIG. 3

```
         301  302 304            300
      ┌───┬───┬───┬───┬───┬───┬───┬───┐
310─LET│ R │ G │ R │ G │ R │ G │ R │ G │
      ├───┼───┼───┼───┼───┼───┼───┼───┤
 303─  │ G │ B │ G │ B │ G │ B │ G │ B │
      ├───┼───┼───┼───┼───┼───┼───┼───┤
320─SET│ R │ G │ R │ G │ R │ G │ R │ G │
      ├───┼───┼───┼───┼───┼───┼───┼───┤
       │ G │ B │ G │ B │ G │ B │ G │ B │
      ├───┼───┼───┼───┼───┼───┼───┼───┤
330─LET│ R │ G │ R │ G │ R │ G │ R │ G │
      ├───┼───┼───┼───┼───┼───┼───┼───┤
       │ G │ B │ G │ B │ G │ B │ G │ B │
      ├───┼───┼───┼───┼───┼───┼───┼───┤
340─SET│ R │ G │ R │ G │ R │ G │ R │ G │
      ├───┼───┼───┼───┼───┼───┼───┼───┤
       │ G │ B │ G │ B │ G │ B │ G │ B │
      └───┴───┴───┴───┴───┴───┴───┴───┘
```

FIG. 4

```
       401 402 403           400
      ┌───┬───┬───┬───┬───┬───┬───┐
410─LET│ R │ G │ B │ G │ R │ B │ G │
      ├───┼───┼───┼───┼───┼───┼───┤
420─SET│ R │ G │ B │ G │ R │ B │ G │
      ├───┼───┼───┼───┼───┼───┼───┤
430─LET│ R │ G │ B │ G │ R │ B │ G │
      ├───┼───┼───┼───┼───┼───┼───┤
440─SET│ R │ G │ B │ G │ R │ B │ G │
      └───┴───┴───┴───┴───┴───┴───┘
```

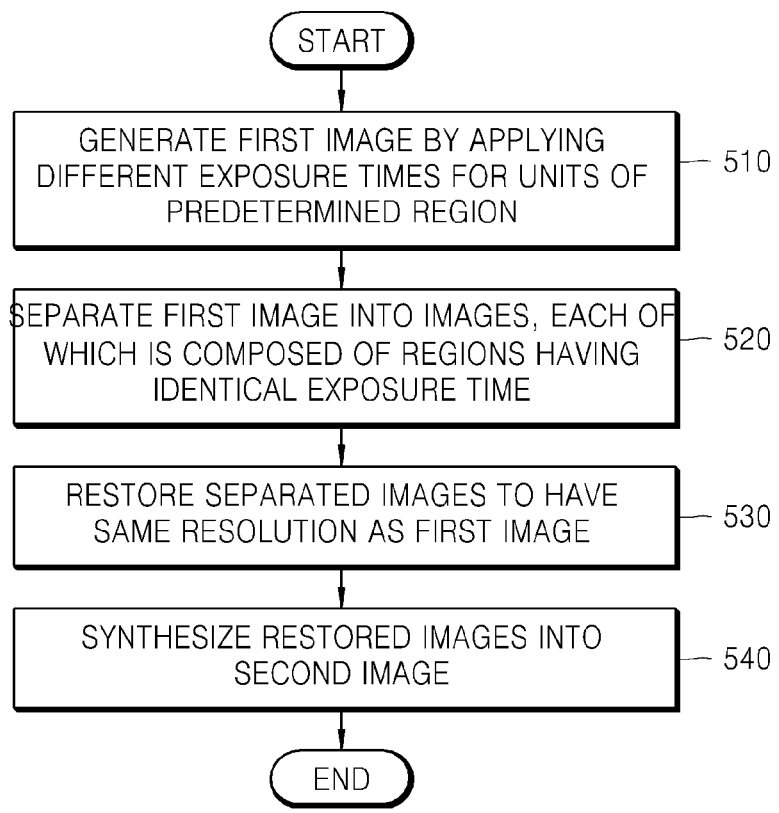

APPARATUS AND METHOD FOR OBTAINING HIGH DYNAMIC RANGE IMAGE

CROSS-REFERENCE TO RELATED PATENT APPLICATION

This application claims the benefit of Korean Patent Application No. 10-2010-0002385, filed on Jan. 11, 2010, in the Korean Intellectual Property Office, the disclosure of which is incorporated herein in its entirety by reference.

BACKGROUND

1. Field

Exemplary embodiments relate to an apparatus and method for obtaining a high dynamic range (HDR) image, and more particularly, to an apparatus and method for obtaining an HDR image by controlling an exposure time.

2. Description of the Related Art

A dynamic range of an image refers to a luminance level of an image ranging from a light area to a dark area, which can be represented. The dynamic range is adjusted by changing pixel values which indicate lightness (such as luminance) of an image. A method of implementing a high dynamic range (HDR) recently in the limelight may be roughly classified into three types as described below.

First one is a technique for enhancing the dynamic range and quality of image data being output from an image sensor by using an algorithm in image signal processing. Representative techniques are gamma correction and retinex image enhancement.

Second one is a technique for improving a dynamic range by obtaining two or more images having different exposure amounts and synthesizing those images. The images may be obtained by taking two pictures at different shutter speeds. The images are then synthesized and corrected by using a proper image signal processing algorithm.

Third one is a technique for obtaining two image data by disposing pixels having different sensitivities in a single pixel in an image sensor. Pixel data generated from the pixels having different sensitivities during an identical exposure time shows the same effect as image data generated to have different exposure amounts. Image data generated by the two pixels are synthesized and corrected, thereby obtaining a high dynamic range image.

SUMMARY

The exemplary embodiments provide an apparatus and method for obtaining a high dynamic range (HDR) image by using an image obtained by applying different exposure times on a line basis.

According to an aspect of an exemplary embodiment, there is provided an apparatus for obtaining a high dynamic range (HDR) image. The apparatus includes an image sensor generating a first image by applying different exposure times for different predetermined regions, an image separating unit separating the first image into images, each of which is composed of regions having an identical exposure time, an image restoring unit restoring the separated images in such a way that each of the separated images has a resolution that is the same as a resolution of the first image, and an image synthesizing unit synthesizing the restored images into a second image.

Each of the predetermined regions may be of a corresponding single line.

Each of the predetermined regions may be of corresponding two lines.

Each of predetermined regions may be of a corresponding plurality of pixels.

The image sensor may be provided for a plurality of lines of the predetermined regions.

The apparatus may further include a shutter which controls exposure, the shutter being provided for a plurality of lines of the predetermined regions.

Pixels in the image sensor may be arranged in a Bayer pattern where red pixels and green pixels are alternately arranged in a first line and blue pixels and green pixels are alternately arranged in a second line following the first line.

Pixels in the image sensor may be arranged in a pattern where red pixels, green pixels, and blue pixels are alternately arranged in one of a plurality of lines, the image sensor generates the first image by applying different exposure times for units of a line.

The image restoring unit may perform interpolation by using a neighbor line that is adjacent to a missing line in each of the separated images, to restore the missing line.

The image restoring unit may use a gain factor based on a ratio of exposure times in each of the separated images, to restore the missing line.

The image restoring unit may use a gain factor of a neighbor line, which is adjacent to a missing line in each of the separated images, to restore the missing line.

The image restoring unit may restore using at least two among a gain factor of a neighbor line being adjacent to a missing line in each of the separated images, a gain factor based on a ratio of exposure times in each of the separated images, and interpolation using the neighbor line being adjacent to the missing line in each of the separated images.

The apparatus may further include an image correcting unit which corrects the second image through image signal processing at least one from among white balance (WB), color interpolation (CI), and gamma correction.

The apparatus may further include an image correcting unit which corrects the restored images through image signal processing at least one from among white balance (WB), color interpolation (CI), and gamma correction, wherein the image synthesizing unit synthesizes the corrected images into the second image.

According to another aspect of an exemplary embodiment, there is provided a method of obtaining a high dynamic range (HDR) image. The method includes generating a first image by applying different exposure times for units of predetermined regions; separating the first image into images, each of which is composed of regions having an identical exposure time; restoring the separated images in such a way that each of the separated images has a resolution that is the same as a resolution of the first image; and synthesizing the restored images into a second image.

According to yet another aspect of an exemplary embodiment, there is an apparatus for obtaining a high dynamic range (HDR) image, the apparatus including: an image sensor which generates a first image by applying a first exposure time and a second exposure time to predetermined regions; an image separating unit which separates the first image into two images, one of the two images generated based on the first exposure time and another of the two images generated based on the second exposure time; an image restoring unit which restores the two images so that the two images and the first image have a same resolution; and an image synthesizing unit which synthesizes the restored two images into a second image.

In another aspect of an exemplary embodiment, there is a method of obtaining a high dynamic range (HDR) image, the method including: generating a first image by applying a first exposure time and a second exposure time in predetermined regions; separating the first image into two images, one of the two images being generated based on the first exposure time and another of the two images being generated based on the second exposure time; restoring the two images so that the two images and the first image have a same resolution; and synthesizing the restored two images into a second image.

BRIEF DESCRIPTION OF THE DRAWINGS

The above and other features of the exemplary embodiments will become more apparent by describing in detail with reference to the attached drawings in which:

FIG. 3 shows an example where an image is generated by applying different exposure time on a line basis in an image sensor having a Bayer pattern according to an exemplary embodiment;

FIG. 4 shows an example where an image is generated by applying different exposure time on a line basis in an image sensor having a color filter array pattern other than a Bayer pattern according to an exemplary embodiment;

FIG. 5 is a flowchart showing a method of obtaining an HDR image according to an exemplary embodiment;

DETAILED DESCRIPTION

Hereinafter, exemplary embodiments will be described in detail with reference to the accompanying drawings.

Figure 1:
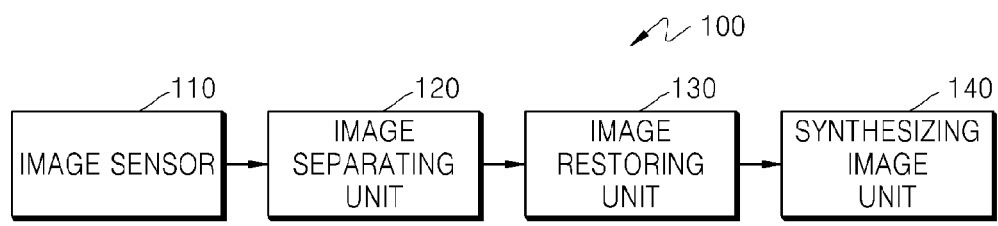
FIG. 1 is a block diagram of an apparatus for obtaining a high dynamic range (HDR) image according to an exemplary embodiment.

FIG. 1 is a block diagram of an apparatus 100 for obtaining a high dynamic range (HDR) image according to an exemplary embodiment.

Referring to FIG. 1, the apparatus 100 for obtaining an HDR image includes an image sensor 110, an image separating unit 120, an image restoring unit 130, and an image synthesizing unit 140.

The image sensor 110 generates a first image by applying different exposure times for different predetermined regions. In general, the image sensor 110 refers to a device capable of taking an image by using a semiconductor's property of reacting with light. Since portions of an object existing in the natural world have different brightnesses and wavelengths, the image sensor 110 converts light energy obtained by brightness and wavelength through a lens into an electric signal. Representative examples of the image sensor 110 may include a charge coupled device (CCD) image sensor and a complimentary metal oxide semiconductor (CMOS) image sensor. The image sensor 110 is composed of mxn pixels and image data output from the image sensor 110 is also composed of an mxn image pixel array. A method of applying different exposure times to a single image may be implemented by electronically controlling a data capture time of the image sensor 110 or by physically controlling a shutter of a camera in predetermined region units.

The predetermined region may be preferably composed of every at least one line. Thus, the image sensor 110 may generate the first image by applying different exposure times to different two-line units. The image sensor 110 may control an exposure time for each line by including a separate sensor or shutter for each line. The predetermined region may be composed of at least two pixels.

Figure 2:
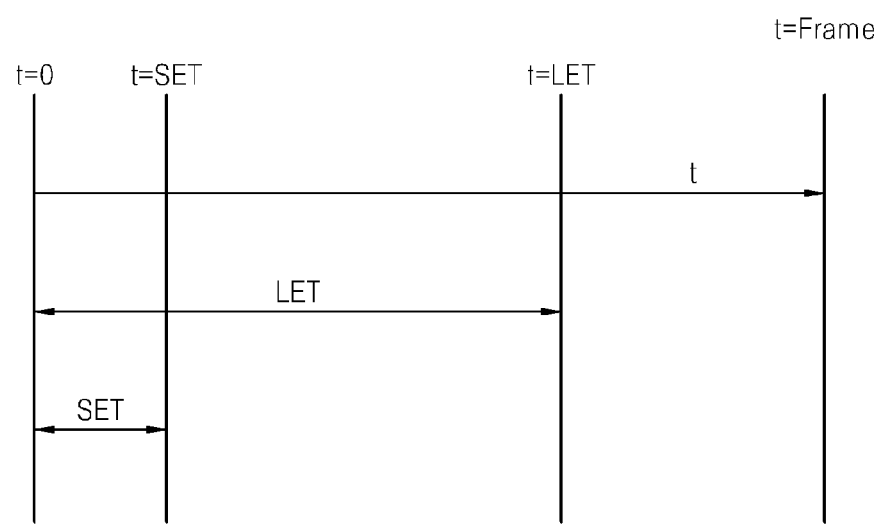
FIG. 2 is a graph showing an exposure time according to an exemplary embodiment.

FIG. 2 is a graph showing an exposure time according to an exemplary embodiment.

Referring to FIG. 2, 't' represents time, 't=FRAME' represents a time for taking an image corresponding to a frame, 't=LET' represents a long exposure time (LET) for a predetermined line in an image, and 't=SET' represents a short exposure time (SET) for a predetermined line in an image.

Since the image sensor 110 itself can record only a brightness of an image or an intensity of light, the image sensor 110 needs a color filter. In a color filter array (CFA) of the image sensor 110, each pixel can record only one of red, green, and blue. Pixels in the image sensor 110 are arranged in a pattern called a Bayer pattern. In the Bayer pattern, a line is provided with red and green pixels arranged alternately and the next line is provided with green and blue pixels arranged alternately. In an exemplary embodiment, when pixels in the image sensor 110 are arranged in a Bayer pattern, different exposure times are applied for different two-line units. If different exposure times are applied for different single lines, color prediction may be difficult to perform because a line is composed of red pixels and green pixels, green pixels, or blue pixels, that is, a line does not include all of red pixels, green pixels, and blue pixels. As a result, it is necessary to apply different exposure times for different two-line units such that two lines including all of red pixels, green pixels, and blue pixels in a Bayer pattern can have an identical exposure time. In this case, an image having a wide dynamic range can be obtained.

FIG. 3 shows an example where an image is generated by applying different exposure time on a line basis in an image sensor having a Bayer pattern according to an exemplary embodiment.

Referring to FIG. 3, in a Bayer pattern 300, a line is provided with red pixels R 301 and green pixels G 302 arranged alternately, and a next line is provided with green pixels G 303 and blue pixels B 304 arranged alternately. Different exposure times are applied for different consecutive two-line units. First two lines have an LET 310 and next two lines have an SET 320. An LET 330 and an SET 340 are alternately applied for every two lines for the remaining lines.

FIG. 4 shows an example where an image is generated by applying different exposure time on a line basis in an image sensor having a color filter array pattern other than a Bayer pattern according to an exemplary embodiment.

Referring to FIG. 4, in a pattern 400, all of red pixels R 401, green pixels G 402, and blue pixels B 403 are arranged in each line. In this case, different exposure times are applied for different lines. LETs 410 and 430 and SETs 420 and 440 are alternately applied to respective lines.

The image separating unit 120 separates the first image generated by the image sensor 110. More specifically, the image separating unit 120 separates the first image into images, each of which is composed of lines having an identical exposure time. For example, when an exposure amount is controlled alternately for an LET and an SET in two-line units as shown in FIG. 3, the image separating unit 120 separates the first image into an image composed of lines having an LET and an image composed of lines having an SET. In this case, the resolution of each of the separated images is half the resolution of the first image.

The image restoring unit 130 restores the separated images such that each of the separated images has the same resolution as that of the first image. An image restoring method is using interlaced-to-progressive conversion (IPC) which is widely known in video processing. The IPC refers to converting an interlaced signal into a progressive signal. The IPC performs interpolation by using two adjacent lines to restore a missing line between the adjacent lines. In an exemplary embodiment, to restore a missing line in each of the separated images, interpolation is performed by using two lines being adjacent to the missing line. When a missing line is restored by interpolation, each of the restored images has the same resolution as the first image. For example, if the separated image is composed of lines having an LET, lines having an SET in the first image are missing lines and interpolation is performed by using two lines having the LET which are adjacent to each missing line, thereby restoring the missing lines. In the same manner, missing lines are restored when the separated image is composed of lines having an SET. However, when different exposure times are applied to different two-line units, consecutive two lines, rather than a single line like in IPC, are missing lines. In this case, an algorithm which is similar to, rather than the same as, IPC is used.

Another image restoring method is using a gain factor based on a ratio of two exposure times of the separated images. When the separated images are restored in this way, missing lines can be accurately restored in a region where a sensor linearly reacts. In a region where the sensor non-linearly reacts, however, the gain factor obtained based on the ratio of exposure times may have an error.

Thus, another image restoring method is using a gain factor of a neighbor line which is adjacent to a missing line in each of the separated images.

The foregoing image restoring methods (the use of IPC, the use of a gain factor based on a ratio of exposure times, and the use of a gain factor of a neighbor line) have advantages and disadvantages in terms of resolution and artifacts. Therefore, to optimize resolution while minimizing artifacts, the image restoring unit 130 restores missing lines by properly using the image restoring methods in combination.

The image synthesizing unit 140 synthesizes the restored images having an identical resolution into a second image having the identical resolution. A way to synthesize two images into a single image is widely known, and thus will not be described in detail.

Although not shown in FIG. 1, the apparatus 100 may further include an image correcting unit which corrects the synthesized second image through image signal processing including at least one of white valance (WB), color interpolation (CI), and gamma correction. The image correcting unit may correct the restored images through the image signal processing. In this case, the image synthesizing unit 140 may generate the second image by synthesizing the corrected images.

FIG. 5 is a flowchart showing a method of obtaining an HDR image according to an exemplary embodiment.

Referring to FIG. 5, in operation 510, a first image is generated by applying different exposure times for different predetermined regions. In general, the first image is generated by the image sensor 110. The image sensor 110 is composed of mxn pixels and image data being output from the image sensor 110 is also composed of an mxn image pixel array. A method of applying different exposure times to a single image may be implemented by electronically controlling a data capture time of the image sensor 110 or by physically controlling a shutter of a camera in predetermined region units. One of the predetermined regions may be preferably composed of at least one line. Thus, the image sensor 110 may generate the first image by applying different exposure times to different two-line units. The image sensor 110 may control an exposure time for each line by including a separate sensor or shutter for each line. The predetermined region may be composed of at least two pixels. Since the image sensor 110 itself can record only a brightness of an image or an intensity of light, the image sensor 110 needs a color filter. In a color filter array (CFA) of the image sensor 110, each pixel can record only one of red, green, and blue. Pixels in the image sensor 110 are arranged in a pattern called a Bayer pattern. In the Bayer pattern, a line is provided with red and green pixels arranged alternately and the next line is provided with green and blue pixels arranged alternately. In an exemplary embodiment, when pixels in the image sensor 110 are arranged in a Bayer pattern, different exposure times are applied for different two-line units. If different exposure times are applied different lines, color prediction may be difficult to perform because a line is composed of red pixels and green pixels, green pixels, or blue pixels, that is, a line does not include all of red pixels, green pixels, and blue pixels. As a result, it is necessary to apply different exposure times for two-line units such that two lines including all of red pixels, green pixels, and blue pixels in a Bayer pattern can have an identical exposure time. In this case, an image having a wide dynamic range can be obtained.

In an exemplary embodiment, the Bayer pattern is used in the image sensor 110, first two lines have an LET and next two lines have an SET. That is, the LET and the SET are alternately applied to every two lines.

When a pattern of the color filter array used in the image sensor 110 is such that all of red pixels, green pixels, and blue pixels are arranged in a single line, the apparatus 100 for obtaining a HDR image applies different exposure times for different lines. For example, the apparatus 100 alternately applies an LET and an SET for different lines.

In operation 520, the first image is separated into images, each of which is composed of regions having an identical exposure time. For example, when a predetermined region is defined on a line basis, more specifically, when the predetermined region is defined for every two lines, if an exposure amount is controlled alternately for an LET and an SET in two-line units, the first image is separated into an image composed of lines having the LET and an image composed of lines having the SET. In this case, the resolution of each of the separated images is half the resolution of the first image.

In operation 530, the separated images are restored such that each of them has the same resolution as the resolution of the first image. For example, if one of the separated images is composed of lines having an LET, lines having an SET in the first image are missing lines and the missing lines are restored by using a predetermined method. In this case, the resolution of each of the restored images is the same as the resolution of the first image.

In operation 540, the restored images having the identical resolution are synthesized into a single second image having the identical resolution. A way to synthesize two images into a single image is widely known, and thus will not be described in detail.

Figure 6:
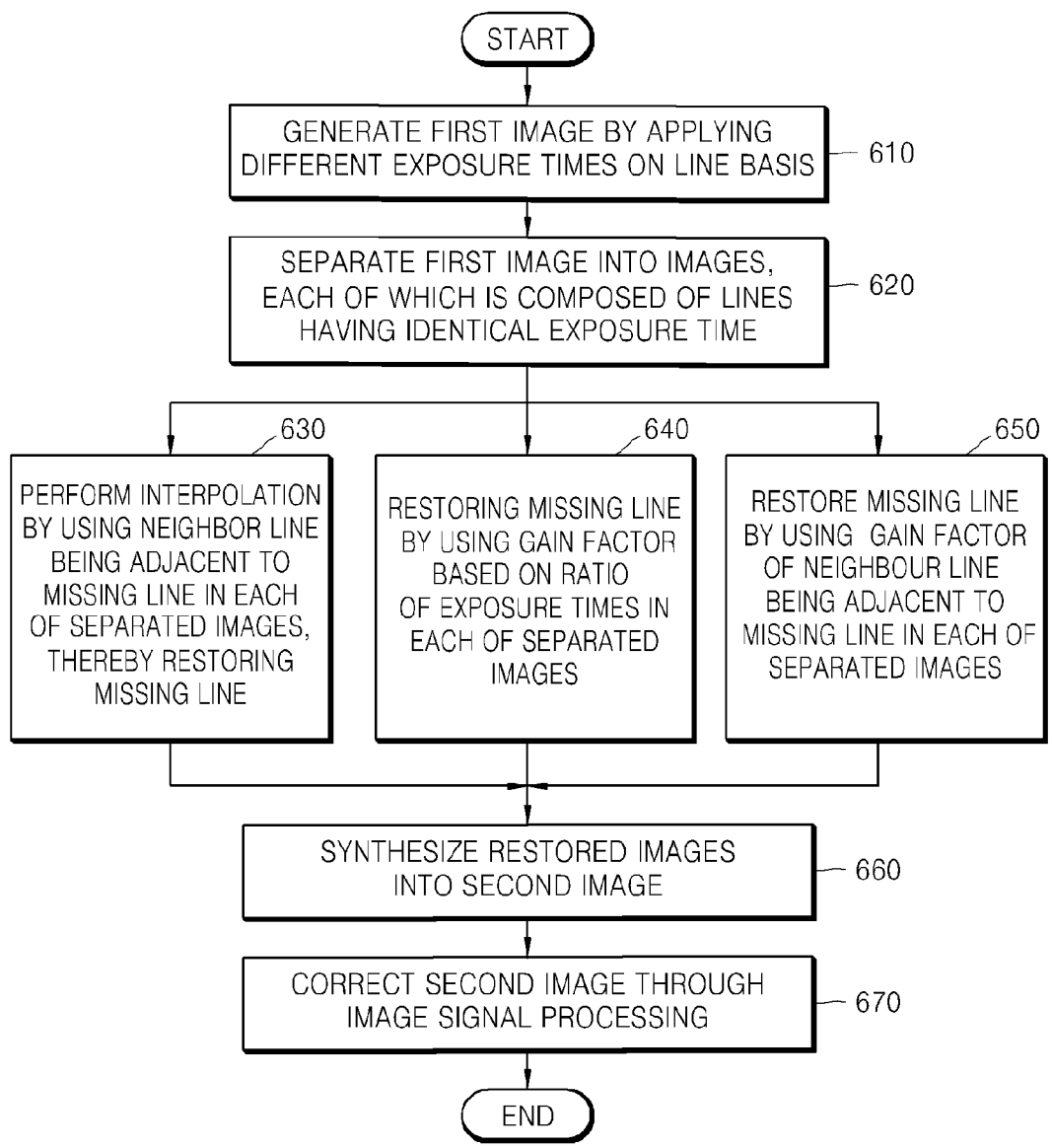
FIG. 6 is a flowchart showing a method of obtaining an HDR image according to another exemplary embodiment.

FIG. 6 is a flowchart showing a method of obtaining an HDR image according to another exemplary embodiment.

Operations 610 and 620 are similar to operations 510 and 520 of FIG. 5. However, a predetermined region is defined on a line basis. Operation 650 is the same as operation 540 of FIG. 5 and thus will not be described.

Operations 630 and 640 are detailed operations of operation 530 of FIG. 5 where the separated images are restored.

In operation 630, interpolation is performed in each of the separated images by using a neighbor line that is adjacent to a missing line, thereby restoring the missing line. This method uses IPC widely known in video processing. The IPC performs interpolation by using two adjacent lines to restore a missing line between the two adjacent lines. In an exemplary embodiment, to restore a missing line in each of the separated images, interpolation is performed by using two lines being adjacent to the missing line. When a missing line is restored by interpolation, each of the restored images has the same resolution as the first image. For example, if the separated image is composed of lines having an LET, lines having an SET in the first image are missing lines and interpolation is performed by using two lines having the LET which are adjacent to each missing line, thereby restoring the missing lines. In the same manner, missing lines are restored when the separated image is composed of lines having an SET. However, when different exposure times are applied for different two-line units, consecutive two lines, rather than a single line like in IPC, are missing lines. In this case, an algorithm which is similar to, rather than the same as, IPC is used.

In operation 640, a missing line is restored by using a gain factor based on a ratio of two exposure times in each of the separated images. When the separated images are restored in this way, a missing line can be accurately restored in a region where a sensor linearly reacts. In a region where the sensor non-linearly reacts, however, the gain factor obtained based on the ratio of exposure times may have an error.

In operation 650, a missing line is restored by using a gain factor of a neighbour line being adjacent to the missing line in each of the separated images.

Operations 630 through 650 have advantages and disadvantages in terms of resolution and artifacts, and therefore, to optimize resolution while minimizing artifacts, they may be performed alone or in combination.

In operation 660, the restored images are synthesized into a single second image.

In operation 670, the synthesized second image is corrected through image signal processing including at least one of white balance (WB), color interpolation (CI), and gamma correction.

Figure 7:
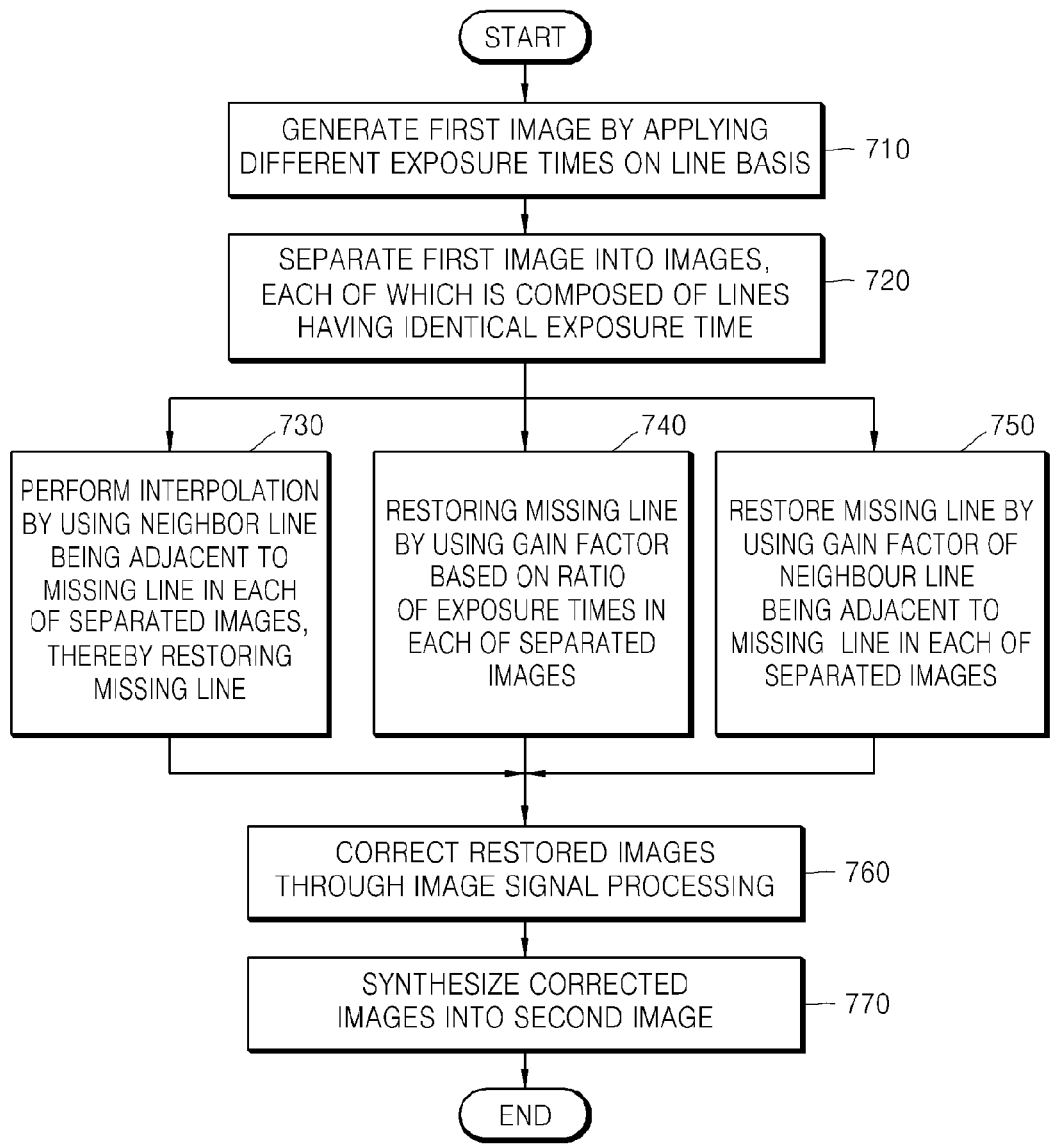
FIG. 7 is a flowchart showing a method of obtaining an HDR image according to another exemplary embodiment.

FIG. 7 is a flowchart showing a method of obtaining an HDR image according to another exemplary embodiment.

Operations 710, 720, 730, 740, and 750 are the same as operations 610, 620, 630, 640, and 650 of FIG. 6 and thus will not be described.

In operation 760 unlike operation 660 of FIG. 6, images restored through operations 730, 740, and 750 are corrected through image signal processing. Thereafter, in operation 770, the corrected images are synthesized into a single second image.

The method of obtaining an HDR image according to the present invention can be embodied as a computer-readable code on a computer-readable recording medium. The computer-readable recording medium is any data storage device that can store data which can be thereafter read by a computer system. Examples of computer-readable recording media include read-only memory (ROM), random-access memory (RAM), CD-ROMs, magnetic tapes, floppy disks, optical data storage devices. The computer-readable recording medium can also be distributed over network of coupled computer systems so that the computer-readable code is stored and executed in a decentralized fashion. Also, functional programs, code, and code segments for implementing the signal processing method can be easily construed by programmers of skill in the art.

While the present invention has been particularly shown and described with reference to exemplary embodiments thereof, it will be understood by those of ordinary skill in the art that various changes in form and details may be made therein without departing from the spirit and scope of the present invention as defined by the following claims. Accordingly, the disclosed embodiments should be considered in an illustrative sense not in a limiting sense. The scope of the present invention is defined not by the detailed description of the present invention but by the appended claims, and all differences within the scope will be construed as being included in the present invention.

What is claimed is:

1. An apparatus for obtaining a high dynamic range (HDR) image, the apparatus comprising:
    an image sensor which generates a first image by applying different exposure times for units of a predetermined region;
    an image separating unit which separates the first image into images, each of which is composed of regions having an identical exposure time;
    an image restoring unit which restores the separated images in such a way that each of the separated images has a resolution that is the same as a resolution of the first image; and
    an image synthesizing unit which synthesizes the restored images into a second image.

2. The apparatus of claim 1, wherein each of the predetermined regions are of a corresponding single line.

3. The apparatus of claim 1, wherein each of the predetermined regions are of corresponding two lines.

4. The apparatus of claim 1, wherein the each of predetermined regions are of a corresponding plurality of pixels.

5. The apparatus of claim 2, wherein the image sensor is provided for a plurality of lines of the predetermined regions.

6. The apparatus of claim 2, further comprising a shutter which controls exposure, the shutter being provided for a plurality of lines of the predetermined regions.

7. The apparatus of claim 3, wherein pixels in the image sensor are arranged in a Bayer pattern where red pixels and green pixels are alternately arranged in a first line and blue pixels and green pixels are alternately arranged in a second line following the first line.

8. The apparatus of claim 2, wherein when pixels in the image sensor are arranged in a pattern where red pixels, green pixels, and blue pixels are alternately arranged in one of a plurality of lines, the image sensor generates the first image by applying different exposure times in units of a line.

9. The apparatus of claim 2, wherein the image restoring unit performs interpolation by using a neighbor line that is adjacent to a missing line in each of the separated images, to restore the missing line.

10. The apparatus of claim 2, wherein the image restoring unit uses a gain factor based on a ratio of exposure times in each of the separated images, to restore the missing line.

11. The apparatus of claim 2, wherein the image restoring unit uses a gain factor of a neighbor line, which is adjacent to a missing line in each of the separated images, to restore the missing line.

12. The apparatus of claim 2, wherein the image restoring unit restores using at least two among a gain factor of a neighbor line being adjacent to a missing line in each of the separated images, a gain factor based on a ratio of exposure times in each of the separated images, and interpolation using the neighbor line being adjacent to the missing line in each of the separated images.

13. The apparatus of claim 1, further comprising an image correcting unit which corrects the second image through image signal processing at least one from among white balance (WB), color interpolation (CI), and gamma correction.

14. The apparatus of claim 1, further comprising an image correcting unit which corrects the restored images through image signal processing at least one from among white balance (WB), color interpolation (CI), and gamma correction,
wherein the image synthesizing unit synthesizes the corrected images into the second image.

15. A method of obtaining a high dynamic range (HDR) image, the method comprising:
generating a first image by applying different exposure times for units of a predetermined region;
separating the first image into images, each of which is composed of regions having an identical exposure time;
restoring the separated images in such a way that each of the separated images has a resolution that is the same as a resolution of the first image; and
synthesizing the restored images into a second image.

16. A non-transitory computer-readable recording medium having embodied thereon a program for executing a method of obtaining a high dynamic range (HDR) image, the method comprising:
generating a first image by applying different exposure times for units of a predetermined region;
separating the first image into images, each of which is composed of regions having an identical exposure time;
restoring the separated images in such a way that each of the separated images has a resolution that is the same as a resolution of the first image; and
synthesizing the restored images into a second image.

17. A method of obtaining a high dynamic range image, the method comprising:
capturing a first image by using a first exposure time and a second exposure time;
separating the first image into a first portion captured using the first exposure time and a second portion captured using the second exposure time;
scaling up the first and the second portions so that a resolution of the scaled up first portion and the scaled up second portion and a resolution of the first image are the same; and
combining the scaled up first and the scaled up second portions.

18. The method of claim 17, wherein the capturing comprises:
dividing a capturing area of a sensor into a plurality of regions;
applying the first exposure time to a first set of the plurality of regions; and
applying the second exposure time to a second set of the plurality of regions.

19. The method of claim 18, wherein the first and the second exposure times are applied by controlling a shutter or by controlling image capture time.

* * * * *